US 6,634,710 B1

(12) United States Patent
Adamson, Sr. et al.

(10) Patent No.: US 6,634,710 B1
(45) Date of Patent: Oct. 21, 2003

(54) VEHICLE SEAT ASSEMBLY HAVING CHILD SEAT ATTACHMENTS

(75) Inventors: Richard Adamson, Sr., Almont, MI (US); Philip Verdura, West Bloomfield, MI (US); Michelle Raybon, St. Clair Shore, MI (US); Paul S. Severinski, Brownstown, MI (US)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 09/966,328

(22) Filed: Sep. 28, 2001

(51) Int. Cl.[7] ................................................ A47C 1/08
(52) U.S. Cl. .................. 297/253; 297/250.1; 248/503.1
(58) Field of Search ............................ 297/250.1, 252, 297/253, 254, 216.11, 463.1; 296/63, 64; 248/503.1, 500, 214, 300, 200, 220.2

(56) References Cited

U.S. PATENT DOCUMENTS

| 4,595,164 | A | * | 6/1986 | Froutzis et al. ............. 248/429 |
| 4,673,151 | A |   | 6/1987 | Pelz |
| 4,685,716 | A | * | 8/1987 | Kondo ........................ 296/63 |
| 4,822,092 | A |   | 4/1989 | Sweers |
| 5,263,763 | A | * | 11/1993 | Billette ....................... 296/65.1 |
| 5,466,044 | A |   | 11/1995 | Barley et al. |
| 5,487,588 | A |   | 1/1996 | Burleigh et al. |
| 5,628,595 | A | * | 5/1997 | Harris ........................... 410/7 |
| 5,730,414 | A | * | 3/1998 | Wenger et al. ........... 248/503.1 |
| 5,816,651 | A |   | 10/1998 | Feuerherdt |
| 5,833,203 | A | * | 11/1998 | Denis et al. ............. 248/503.1 |
| 5,918,934 | A |   | 7/1999 | Siegrist |
| 5,941,600 | A |   | 8/1999 | Mar et al. |
| 5,941,601 | A |   | 8/1999 | Scott et al. |
| 6,030,046 | A |   | 2/2000 | Dorow |
| 6,082,818 | A |   | 7/2000 | Muller |
| 6,145,912 | A | * | 11/2000 | Rice et al. ................ 296/65.03 |
| 6,183,044 | B1 | * | 2/2001 | Koyanagi et al. ...... 297/256.16 |
| 6,276,754 | B1 |   | 8/2001 | Youssef-Agha et al. |

* cited by examiner

Primary Examiner—Peter M. Cuomo
Assistant Examiner—Stephen Vu
(74) Attorney, Agent, or Firm—Bill C. Panagos; MacMillan, Sobanski & Todd, LLC

(57) ABSTRACT

A vehicle seat assembly includes a seat frame for supporting a cushion of a seat. A bracket is attached to the seat frame. The bracket includes mounting locations for fastening the bracket to a floor portion of a vehicle. At least one pair of anchor wires are attached to the bracket. Each of the anchor wires includes first and second legs which are attached to the bracket, and a latch receiving portion interconnecting the first and second legs. The latch receiving portion is adapted to be releasably engageable with a corresponding latch mechanism on a child safety seat.

20 Claims, 4 Drawing Sheets

VEHICLE SEAT ASSEMBLY HAVING CHILD SEAT ATTACHMENTS

BACKGROUND OF THE INVENTION

This invention relates in general to vehicle seats, and in particular to a structure of a vehicle seat incorporating anchoring wires for use in securing a child safety seat to a passenger seat.

Automotive child safety seats have typically been secured to passenger seats of a vehicle using straps, such as the existing seat belt for adult passengers. The ends of the seat belt are anchored to structural members of the automobile. The seat belt is directed through apertures or slots formed in the child safety seat, thereby securing the child seat relative to the seat belt. It is often laborious and sometimes complicated to fasten the child safety seat by means of the seat belt. Due to the flexible nature of the seat belt, the position of the child seat may also shift during operation of the vehicle.

To overcome these problems associated with securing a child safety seat with the existing seat belt, various regulations have been implemented requiring standardized structures and methods for securing child seats within an automobile. One such regulation was promulgated by the U.S. National Highway Traffic Safety Administration, entitled "Federal Motor Vehicle Safety Standards; Child Restraint Systems; Child Restraint Anchorage Systems", (64 FR 10786). The regulation requires that motor vehicle manufacturers provide a new way of installing child seats that are standardized and independent of the vehicle seat belts by use of a new anchorage system. Suitable child safety seats will include restraints or latches for coupling to the anchorage systems. The anchorage system includes a pair of spaced apart anchoring wires having a generally U-shaped configuration functioning as a receiving portion for a cooperating latch of a child safety seat. The anchoring wires are secured relative to the vehicle to provide a rigid support for transmitting the load or force from the child seat upon impact or rapid deceleration of the vehicle.

The anchor wires are formed from a rod having a continuous circular cross-sectional shape. The anchor wires are generally U-shaped having a pair of legs secured relative to the vehicle. The legs are identical in shape and are parallel relative to one another. The anchoring wires further include a cross bar connecting ends of the legs, thereby forming a generally U-shaped loop. The cross bars function as receiving portions for the coupling of a pair of corresponding latch mechanisms of a child seat. The latch mechanisms are located on opposed bottom side corners of the child seat.

BRIEF SUMMARY OF THE INVENTION

This invention relates to a vehicle seat assembly which includes a mounting bracket having connections for releasably attaching a child safety seat.

The vehicle seat assembly includes a seat frame for supporting a cushion of a seat. A bracket is attached to the seat frame. The bracket includes mounting locations for fastening the bracket to a floor portion of a vehicle. At least one pair of anchor wires are attached to the bracket. Each of the anchor wires includes first and second legs which are attached to the bracket, and a latch receiving portion interconnecting the first and second legs. The latch receiving portion is adapted to be releasably engageable with a corresponding latch mechanism on a child safety seat.

Various objects and advantages of this invention will become apparent to those skilled in the art from the following detailed description of the preferred embodiment, when read in light of the accompanying drawings.

DETAILED DESCRIPTION OF THE INVENTION

Figure 1:
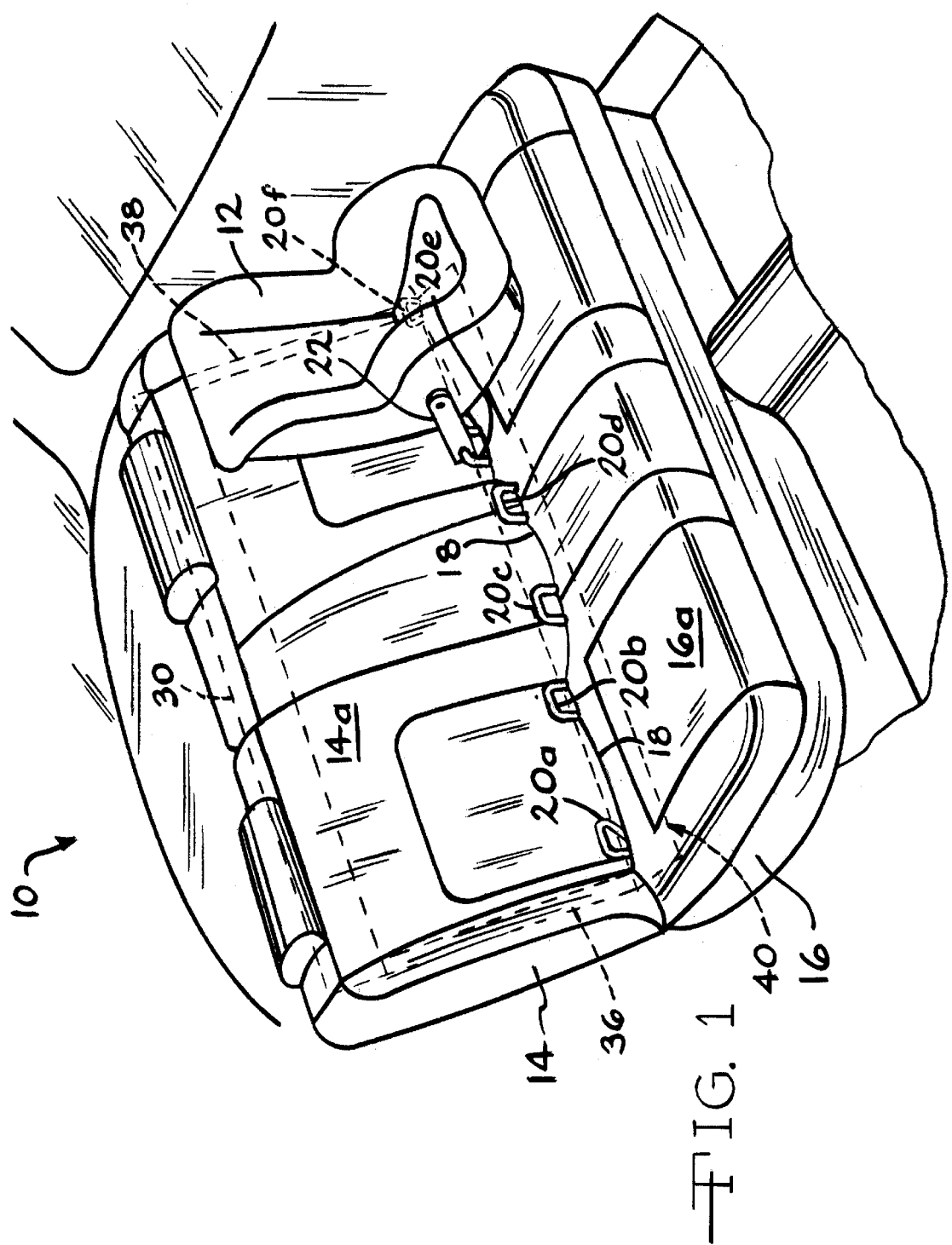
FIG. 1 is a perspective view of a vehicle seat assembly, in accordance with the present invention, wherein a child safety seat is shown attached thereto.

Referring now to the drawings, there is illustrated in FIG. 1 a vehicle seat assembly, indicated generally at 10, in accordance with the present invention. The seat assembly 10 includes various structures, as will be described below, which provide for an attachment or anchorage point for a child safety seat 12.

The seat assembly 10 can be any suitable seat structure, such as a bench-style seat, adapted to be mounted within an interior of a vehicle. The seat assembly includes a seat back 14 and a seat bottom 16. The seat back 14 and seat bottom 16 include cushions 14a and 16a defining seating surfaces for occupants of the seat assembly 10. The cushions 14a and 16a can be formed of any conventional materials, such as foam padding covered in a suitable trim material, such as cloth or leather. The intersection of the seat back 14 with the seat bottom 16 defines a seat bight 18. The seat bight 18 is the region between adjacent cushions of the lower portion of the seat back 14 and the rearward portion of the seat bottom 16. As will be described in more detail below, the seat assembly 10 includes one or more anchor wires 20a, 20b, 20c, 20d, 20e, and 20f disposed in the seat bight 18. The anchor wires function as receiving portions for the coupling of a pair of corresponding latch mechanisms 22 secured to the child seat 12. The forces imparted from the child seat 12 upon rapid deceleration of the vehicle are transmitted through the latch mechanisms 22 and anchor wires to a fixed portion of the vehicle, such as a vehicle floor 26. The latch mechanisms 22 are located on opposed bottom side corners of the child seat 10 and mate with a pair of anchor wires. The seat assembly 10 includes three pairs of anchor wires 20a and 20b, 20c and 20d, and 20e and 20f, respectfully, to provide three locations for the child seat 12. Of course, the seat assembly 10 can have any suitable number of anchor wires.

Figure 2:
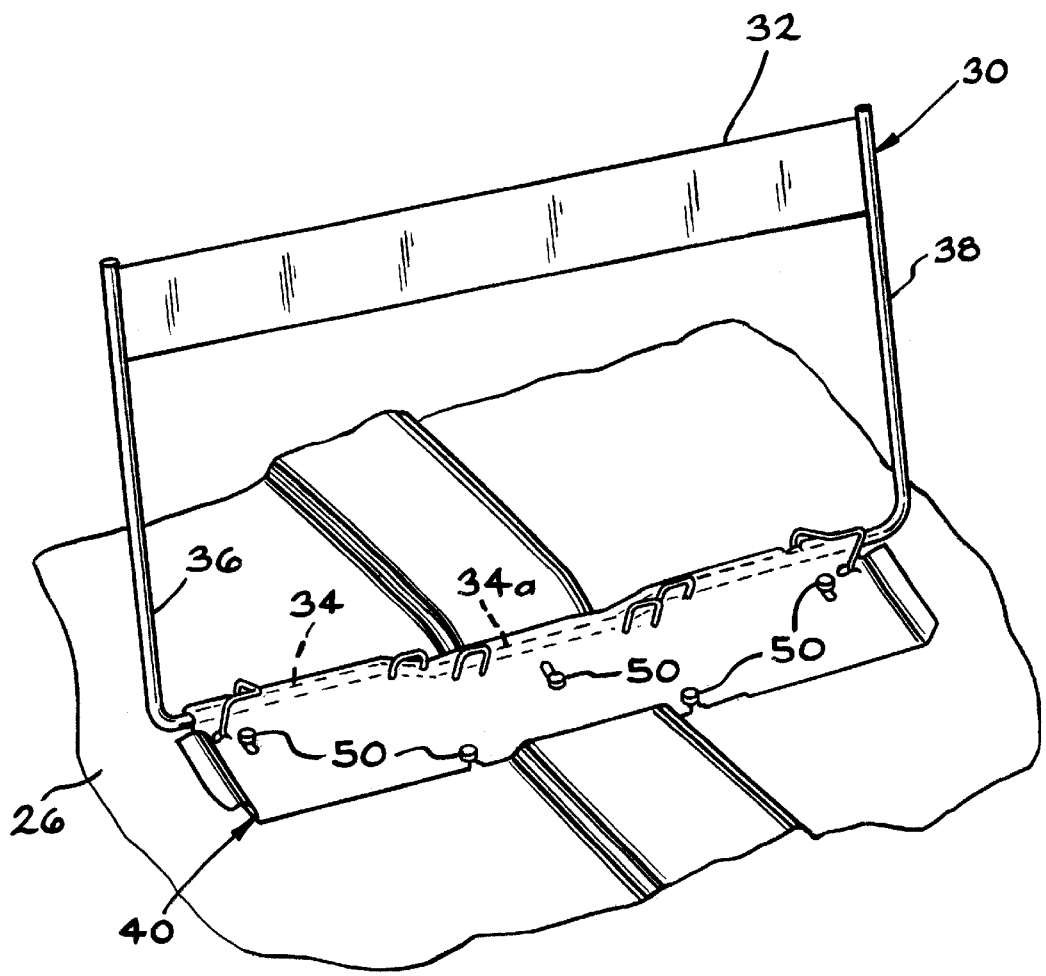
FIG. 2 is a perspective view of the seat frame and bracket for the seat assembly of FIG. 1 mounted on a vehicle floor.

The seat assembly 10 further includes a rear seat frame, indicated generally at 30, for supporting the cushion 14b of the seat back 14. Although the frame 30 can have any suitable configuration, the seat frame 30 preferably has a generally rectangular loop shape, as shown in FIGS. 1 and 2. The frame 30 may also be made of any suitable material, such as metal or plastic. The frame 30 preferably includes an upper horizontally extending member 32 and a lower horizontally extending member 34. The ends of the members 32 and 34 are connected by a pair of members 36 and 38 extending generally at right angles to the members 32 and 34. The members 34, 36, and 38 can be formed from a length of metal tubular rod having a generally continuous cross-section which is generally bent at right angles to form the members 34, 36, and 38. The upper member 32 can be formed from a stamped sheet. The upper member 32 may include various features attached thereto, such as portions of a latch assembly (not shown) for releasably attaching the upper portion of the seat back 14 to secure the seat back 14 between a raised normal seating position, as shown in FIG. 1, and a lowered position relative to the seat bottom 16 to provide access to a rear cargo area of the vehicle.

Although the seat assembly 10 is shown as a single bench-style seat, the seat assembly 10 and the frame 30 can be configured as a split bench seat, wherein the seat assembly has two or more seating areas. The different seating areas can have different seat backs which may be pivoted forward to provide access to a rear storage area of the vehicle.

The seat assembly 10 further includes a bracket, indicated generally at 40, which is attached to the lower member 34, such as by a weld. As will be described below in more detail, the bracket 40 provides for a mounting location for fastening the seat assembly 10 to the vehicle floor 26, as well as providing mounting locations for the anchor wires 20a, 20b, 20c, 20d, 20e, and 20f. Thus, fastening of the bracket 40 to the vehicle floor 26 accomplishes both the mounting of the seat assembly 10 as well as providing a force path for the anchor wires to the vehicle floor 26.

Figure 3:
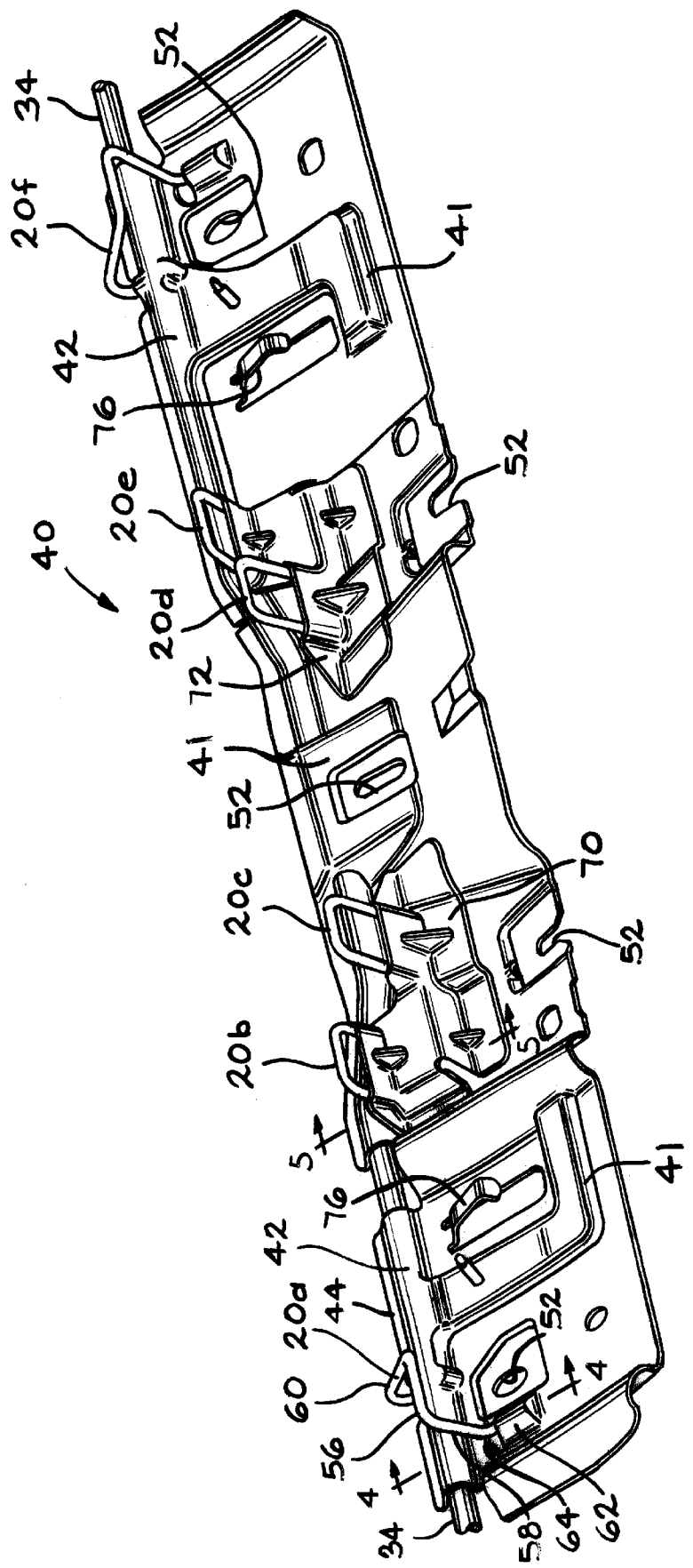
FIG. 3 is an enlarged perspective view of the bracket of FIG. 2.

The bracket 40 is preferably formed from a metal sheet and stamped, punched, or otherwise formed to form the preferred embodiment of the bracket 40 illustrated in FIG. 3. The bracket 40 may include a plurality of stiffening beads or raised portions 41 to provide strength to the otherwise flat bracket 40. The bracket is 40 can include any number and any suitable placement of the raised portions 41. Preferably, the bracket 40 extends across substantially the entire width of the frame 30 and seat assembly 10, as shown in FIGS. 1 and 2. Of course, the width of the bracket 40 may be less than or greater than the width of the frame 30. Also, the bracket 30 may be divided into smaller separate components less than the width of the frame 30. For example, a first bracket (not shown) may include only the anchor wires 20a and 20b, and another second bracket (not shown) may include only the anchor wires 20e and 20f.

The bracket 40 preferably includes a laterally extending recess 42 formed adjacent a rear edge 44 thereof. The recess 42 receives the lower frame member 34 and preferably has a complimentary contour as the cross-sectional shape of the lower frame member 34. The lower frame member 34 is attached to the bracket 40, such as by a weld. As best shown in FIG. 3, the open end of the recess 42 faces downwardly such that the lower frame member 34 is mounted from the bottom of the bracket 40. Of course, the bracket 40 could be configured such that the recess 44 is an upwardly facing recess and the lower frame member 34 is mounted from the top of the bracket 40. Although the lower frame member 34 is shown and described as being continuous across the width of the bracket 40, the frame member 34 may only be formed adjacent the ends of the bracket 40. Thus, a central portion 34a of the lower frame member 34 may be removed, thereby leaving splitting the lower frame member 34 into two components.

The bracket 40 is preferably attached to the vehicle floor 26, such as by threaded fasteners 50 extending upwardly from the floor 26 and extending through slots and/or apertures 52 formed through the bracket 40. The slots and apertures 52 define mounting locations for fastening the bracket 40 to the floor 26. The bracket 40 can have any suitable number of mounting locations. In the embodiment of the bracket 40 illustrated in FIG. 3, there are four mounting locations. The bracket 40 preferably has a contoured shape which is complementary to the portion of the vehicle floor 26 to which it is attached.

As stated above, the anchor wires 20a, 20b, 20c, 20d, 20e, and 20f are fastened to the bracket 40. A force imparted from the child seat 12 upon rapid deceleration of the vehicle is transmitted through the latch mechanisms 22 of the child seat 12, the anchor wires, the portion of the bracket 40 to which the anchor wires are attached, and to the floor 26 of the vehicle. Preferably, the anchor wires are fastened and mounted on the bracket 40 to transfer a generally vertical load as well as a lateral load without fracturing or shearing the portion of the bracket 40 to which the anchor wires are mounted. In a preferred embodiment, the anchor wires are welded to the bracket 40.

As described and illustrated with respect to the anchor wire 20a, each of the anchor wires 20a, 20b, 20c, 20d, 20e, and 20f includes a laterally horizontally extending cross bar 56 which functions as a latch receiving portion to latch with the latch mechanisms 22 of the child seat 12. The cross bars 56 of the pairs of anchor wires are spaced from one another by a predetermined distance corresponding to the spaced relationship of the latch mechanisms 22 of the child seat 12. The forward distance of the pairs of anchor wires can be set at any distance. Preferably, the cross bars 56 extend just slight outward or are slightly tucked in from the seat bight 18 but not too far to interfere with an occupant of the seat. Each of the anchor wires also includes a pair of legs 58 and 60 which extend from the ends of the cross bar 56. The legs 58 and 60 are fastened to the bracket 40. Preferably, the anchor wires 20a, 20b, 20c, 20d, 20e, and 20f are formed form a single length of rod having a generally continuous cross-section, such as a round rod having a generally circular outer perimeter.

Figure 4:
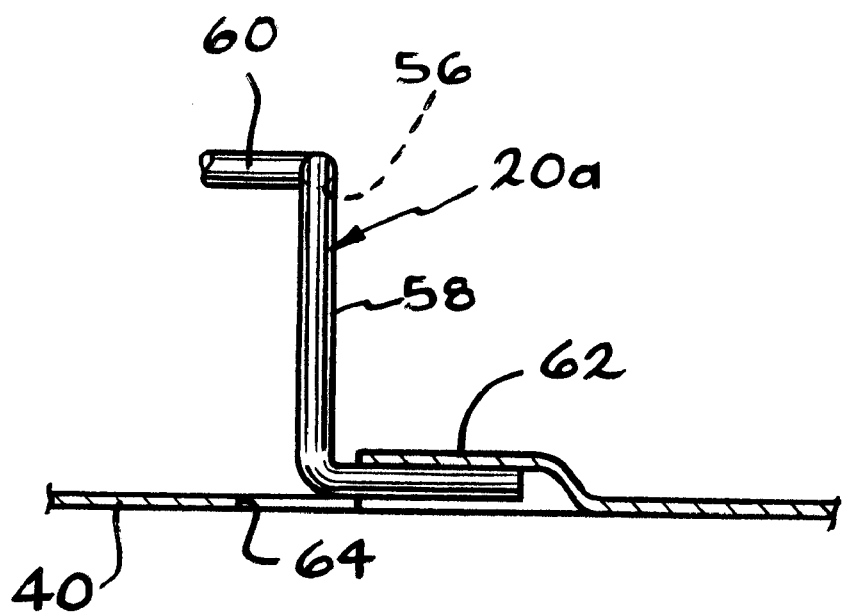
FIG. 4 is a cross-sectional view taken along lines 4—4 of FIG. 3.
Figure 5:
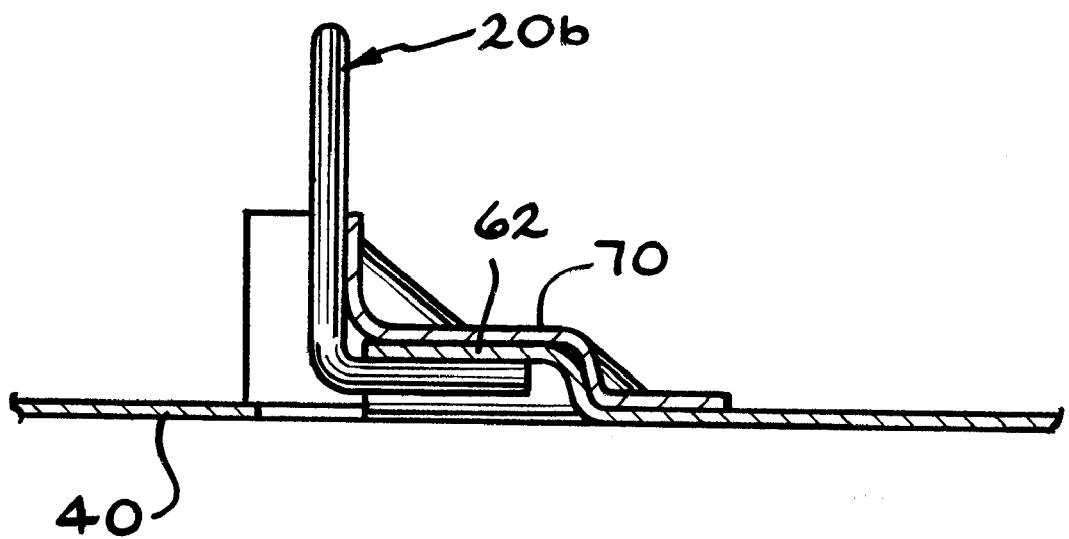
FIG. 5 is a cross-sectional view taken along lines 5—5 of FIG. 3.

As shown with respect to the anchor wires 20a and 20f, the legs 58 and 60 can have a different shape corresponding with the contour and mounting location to the portion of the bracket 40 to which the legs 58 and 60 are attached. As best shown in FIGS. 4, 5 and 6, preferably one or both of the legs 58 and 60 are disposed in a respective bulge or raised portion 62 extending upwardly from a generally flat portion of the bracket 40. The raised portions 62 provide a proper placement mounting location for when the anchor wires are fastened to the bracket 40. The raised portions 62 may also provide added strength to the region of the bracket 40 where the anchor wires are attached thereto. The raised portions 62 also provide clearance for the thickness of the anchor wires when the bracket 40 is lowered onto the floor 26 of the vehicle. The bracket 40 includes apertures 64 formed therein adjacent one end of the raised portion 62 to permit the legs 58 and 60 to extend upward from underneath the raised portion 62.

Preferably, the sheet of material the bracket 40 is formed from is relatively thin to reduce the weight and cost of the bracket 40. However, the sheet should not be too thin that the bracket 40 will not support a load above a predetermined value that is transferred thereto by the anchor wires. To accommodate a relatively thin sheet while still maintaining adequate strength around the area of the bracket 40 to which the anchor wires are mounted, the bracket 40 may include a cover member 70, 72 attached to the bracket at the attachment regions or locations where the legs 58 and 60 are attached to the bracket 40. In the embodiment of the bracket 40 illustrated in FIG. 3, the bracket 40 includes two cover members 70 and 72. The cover member 70 is located over the region of the bracket 40 where the anchor wires 20b and 20c are attached. The cover member 72 is located over the region of the bracket 40 where the anchor wires 20d and 20e are located. The cover members 70 and 72 can be separate members, as shown in FIGS. 3 and 5, or formed from a folded extension of the sheet which forms the bracket 40. The cover members 70 and 72 can be formed from any suitable material, such as metal, and preferably are formed from a stamped sheet. The cover members 70 and 72 preferably have a contour complementary to the contour of the bracket 40. The cover members 70 and 72 can be attached to the bracket 40 by any suitable manner, such as by an adhesive or by welding. As best shown in FIG. 5, the thickness of the bracket 40 above the legs of the anchor wires is increased to provide strength to this region of the bracket 40. The cover members 70 and 72 provide for a relatively light weight bracket 40 which can be produced yet having adequate strength at the regions being subjected to a relatively high force. Although the thickness of the sheet from which the bracket 40 and the cover members 70, 72 are formed from can have any suitable thickness to provide adequate strength, it has been found that a thickness of 2 mm for each of the sheets is sufficient. preferably, the sheets have a thickness from about 1 mm to about 3 mm.

The bracket 40 may also include integrally formed seat cushion fasteners 76. The fasteners 76 can be any suitable shape for temporarily of permanently securing the seat back 14 and/or the seat bottom 16 to the bracket 40. The fasteners 76 can also function solely as locators for placement of the cushions 14a and 16a relative to the bracket 40.

Preferably, the seat assembly 10 is provided in a pre-installed state and then delivered to the assembly plant where the seat assembly is installed into the vehicle. For example, the frame 30, the bracket 40, the seat back 14 and the seat bottom 16 are preferably attached together as a single unit. The seat assembly 10 can then be positioned onto the vehicle floor 62 such that the fasteners 50 are inserted through the apertures 52 of the bracket 40. Once the seat assembly 10 is properly positioned within its mounting location, the bracket 40 can then be fastened to the vehicle floor. If desired, other parts of the seat assembly 10 can be attached to portions of the vehicle. For example, the sides and upper portions of the seat back 14 and seat bottom 16 can be attached to portions of the frame of the vehicle.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

What is claimed is:

1. A vehicle seat assembly comprising:

a seat frame for supporting a cushion of a seat;

a bracket attached to said seat frame, said bracket including mounting locations for fastening said bracket to a floor portion of a vehicle; and at least one pair of anchor wires attached to said bracket, each of said anchor wires including:
   first and second legs attached to said bracket; and
   a latch receiving portion interconnecting said first leg and said second leg, said latch receiving portion adapted to be releasably engaged with a corresponding latch mechanism on a child safety seat.

2. The assembly of claim 1, wherein said first and second legs are rotationally fixed relative to said bracket.

3. The assembly of claim 1, wherein said anchor wires are formed from a single length of rod having a generally continuous cross-section.

4. The assembly of claim 3, wherein said cross-sectional shape of said rod has a generally circular outer perimeter.

5. The assembly of claim 1, wherein said seat frame has a generally rectangular loop shape including a pair of first members and a pair of second members extending in a generally horizontal direction, wherein said first members are generally at right angles relative to said second members.

6. The assembly of claim 5, wherein said bracket is attached to one of said second members.

7. The assembly of claim 1, wherein said mounting locations of said bracket are defined by apertures formed in said bracket.

8. The assembly of claim 1, wherein said bracket is welded to said seat frame.

9. The assembly of claim 1, wherein said bracket is generally formed from a stamped sheet.

10. The assembly of claim 9, wherein said first and second legs are disposed in raised portions formed in said bracket.

11. The assembly of claim 10, wherein said first and second legs are welded to said raised portion of said bracket.

12. The assembly of claim 9, wherein said bracket includes a plurality of raised portions for providing strength to said bracket.

13. The assembly of claim 1, wherein said sheet is about 2 mm thick.

14. The assembly of claim 1, wherein said first and second legs extend through an aperture formed through said bracket.

15. The assembly of claim 1, wherein said bracket further includes integral fasteners for securing one of a seat back and a seat bottom to said frame.

16. A vehicle seat assembly comprising:

a seat frame for supporting a cushion of a seat;

a bracket attached to said seat frame, said bracket including mounting locations for fastening said bracket to a floor portion of a vehicle; and at least one pair of anchor wires attached to said bracket, each of said anchor wires including:
   first and second legs attached to said bracket; and
   a latch receiving portion interconnecting said first leg and said second leg, said latch receiving portion adapted to be releasably engaged with a corresponding latch mechanism on a child safety seat;

wherein said first and second legs of at least one of said anchor wires are attached to said bracket at an attachment location, said seat assembly further including a cover member attached to said bracket over said attachment location to provide additional strength to said bracket at said attachment location.

17. The assembly of claim 16, wherein said first and second legs of said at least one of said anchor wires are positioned below both said attachment location of said bracket and said cover member.

18. The assembly of claim 16, wherein said cover member is generally formed from a stamped sheet.

19. The assembly of claim 18, wherein said sheet is about 2 mm thick.

20. A vehicle seat assembly comprising:

a seat frame for supporting a cushion of a seat;

a bracket attached to said seat frame, said bracket being generally formed from a stamped sheet and including mounting locations for fastening said bracket to a floor portion of a vehicle; and at least one pair of anchor wires attached to said bracket, each of said anchor wires including:

first and second legs welded within raised portions said bracket, said first and second legs are disposed in raised portions formed in said bracket; and a latch receiving portion interconnecting said first leg and said second leg, said latch receiving portion adapted to be releasably engaged with a corresponding latch mechanism on a child safety seat.

\* \* \* \* \*

UNITED STATES PATENT AND TRADEMARK OFFICE
CERTIFICATE OF CORRECTION

PATENT NO. : 6,634,710 B1  Page 1 of 1
DATED : October 21, 2003
INVENTOR(S) : Richard Adamson, Sr. et al.

It is certified that error appears in the above-identified patent and that said Letters Patent is hereby corrected as shown below:

<u>Column 6,</u>
Line 11, after "legs" insert -- directly --.

Signed and Sealed this

Sixteenth Day of December, 2003

JAMES E. ROGAN
*Director of the United States Patent and Trademark Office*